United States Patent
Chen et al.

(10) Patent No.: US 10,341,315 B2
(45) Date of Patent: *Jul. 2, 2019

(54) MANAGEMENT OF ACCESS SESSIONS

(71) Applicant: AirWatch LLC, Atlanta, GA (US)

(72) Inventors: Lucas Chen, Atlanta, GA (US); Adam Rykowski, Atlanta, GA (US); Raghuram Rajan, Atlanta, GA (US); Sridhar Kommireddy, Alpharetta, GA (US)

(73) Assignee: AIRWATCH LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/939,462

(22) Filed: Mar. 29, 2018

(65) Prior Publication Data

US 2018/0219843 A1 Aug. 2, 2018

Related U.S. Application Data

(63) Continuation of application No. 14/807,571, filed on Jul. 23, 2015, now Pat. No. 9,954,833.

(51) Int. Cl.
*G06F 21/31* (2013.01)
*H04L 29/06* (2006.01)

(52) U.S. Cl.
CPC ............ *H04L 63/061* (2013.01); *G06F 21/31* (2013.01); *H04L 63/068* (2013.01)

(58) Field of Classification Search
USPC ........................................................ 713/171
See application file for complete search history.

(56) References Cited

U.S. PATENT DOCUMENTS

| | | | |
|---|---|---|---|
| 7,181,624 B2 | 2/2007 | Asano et al. | |
| 9,954,833 B2* | 4/2018 | Chen | H04L 63/061 |
| 2006/0089125 A1 | 4/2006 | Frank | |
| 2009/0208002 A1 | 8/2009 | Koehane et al. | |
| 2013/0086652 A1* | 4/2013 | Kavantzas | G06F 21/335 726/5 |
| 2013/0145160 A1* | 6/2013 | Bursell | G06F 21/6218 713/168 |
| 2014/0250511 A1* | 9/2014 | Kendall | H04L 63/0815 726/6 |
| 2016/0182562 A1* | 6/2016 | Gupta | H04L 9/0861 726/6 |

OTHER PUBLICATIONS

Non-Final Office Action dated Feb. 13, 2017 (U.S. Appl. No. 14/807,571).
Final Office Action dated Aug. 29, 2017 (U.S. Appl. No. 14/807,571).

* cited by examiner

*Primary Examiner* — Kambiz Zand
*Assistant Examiner* — Aubrey H Wyszynski
(74) *Attorney, Agent, or Firm* — Thomas Horstemeyer, LLP

(57) ABSTRACT

Disclosed are examples of managing access sessions for a computing device. In some examples, a key is generated using a code obtained through a user interface. The key decrypts data stored in a data store of a client device. The key is decrypted using a boot time that represents a latest time the client device was booted. The key is stored in secured storage that is accessible by the at least one application based on a developer certificate.

20 Claims, 6 Drawing Sheets

MANAGEMENT OF ACCESS SESSIONS

CROSS-REFERENCE TO RELATED APPLICATIONS

This application is a continuation of and claims priority to application Ser. No. 14/807,571, filed on Jul. 23, 2015 and titled "MANAGEMENT OF ACCESS SESSIONS," which is incorporated herein by reference in its entirety.

BACKGROUND

Applications, such as messaging applications and web browser applications, can be installed in computing devices. A user can control and interact with the applications to perform various functionality. For example, a user can operate a web browser application to browse web pages, and the user can operate a messaging application to send and receive email messages.

Applications installed in a computing device often communicate with each other. For example, one application can provide content or a message to another application for processing. Some applications can communicate with other applications by sharing files between the applications.

Additionally some computing device operating systems provide an application programming interface (API) that facilitates communication between applications. For example, an application can issue an API call to the operating system requesting the operating system to provide data to a destination application. The API call can specify the destination application and the data to be provided to the destination application. However, when the API call is used to perform communication between applications, the operating system often causes the destination application to become active in the foreground of the client device's display. In this regard, the user interface for the destination application can switch from being in the background to being the active user interface in the foreground of the display device. This action can be distracting and confusing to the user, especially when an application communicates with several other applications in a relatively short period of time.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to application-to-application communications in a client device. The application-to-application communication protocols described herein can be used to implement a single sign on (SSO) scheme for multiple applications in a computing device.

In some examples, an application can communicate with other applications by using secured storage, such as secured password storage, which can be accessible to only applications that are signed by a particular developer certificate. As will be described in further detail below, an application can authenticate a user for multiple applications and then store an encryption key in the secured storage. In addition, the application can store timeout data that indicates when the access session will expire. Other applications that have access to the secured storage can retrieve the encryption key and timeout data stored in the secured storage. If the timeout data indicates that the access session has not yet expired, the application can use the key to, for example, decrypt secured files. If the timeout data indicates that the access session has already expired, the application that retrieved the key can erase the stored key and timeout data. The application can then proceed to re-authenticate user and begin a new access session.

In the following discussion, examples of systems and their components are described, followed by examples of the operation of those systems.

Figure 1:
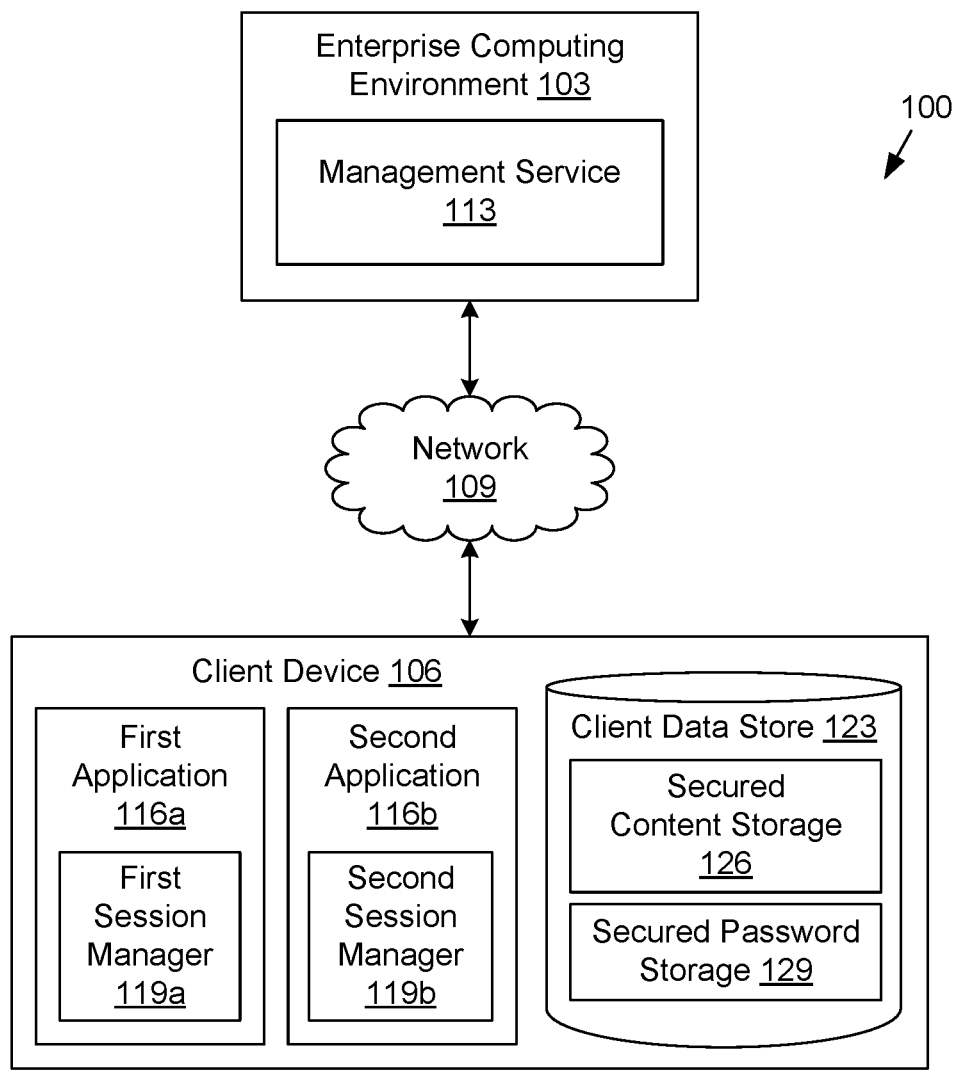
FIG. 1 is a drawing of an example of a networked environment.

With reference to FIG. 1, shown is an example of a networked environment 100. The networked environment 100 can include an enterprise computing environment 103 and a client device 106 in data communication through a network 109. The network 109 can include the Internet, one or more intranets, extranets, wide area networks (WANs), local area networks (LANs), wired networks, wireless networks, or any combination of two or more such networks. The network 109 can include satellite networks, cable networks, Ethernet networks, and telephony networks.

The enterprise computing environment 103 can be a computing environment operated by one or more enterprises, such as businesses or other organizations. The enterprise computing environment 103 can include a computing device, such as a server computer, that can provide computing capabilities. Alternatively, the enterprise computing environment 103 can include multiple computing devices arranged in one or more server banks or computer banks. For examples in which the enterprise computing environment 103 includes multiple computing devices, the computing devices can be located in a single installation, or the computing devices can be distributed among multiple different geographical locations.

In some examples, the enterprise computing environment 103 can include computing devices that together form a hosted computing resource or a grid computing resource. In other examples, the enterprise computing environment 103 can operate as an elastic computing resource for which the allotted capacity of computing-related resources, such as processing resources, network resources, and storage resources, can vary over time. In other examples, the enterprise computing environment 103 can include or be operated as one or more virtualized computer instances that can be executed in order to perform the functionality that is described herein.

The enterprise computing environment 103 can include various systems. For example, the enterprise computing environment 103 can include a management service 113 that can monitor and manage the operation of client devices 106 associated with the enterprise computing environment 103. In some examples, the management service 113 can manage and oversee the operation of multiple client devices 106 enrolled in a mobile device management service that is provided by the management service 113. The management service 113 can also provide the client devices 106 with access to email, calendar data, user contact information, and other resources associated with the enterprise.

The management service 113 can assign various compliance rules to respective client devices 106. The compliance rules can specify one or more conditions that must be satisfied for a respective client device 106 to be deemed compliant with the compliance rule. In one example, a compliance rule can specify that particular applications are prohibited from being installed in a client device 106. In another example, a compliance rule can specify that a lock screen is required to be generated when the client device 106 is "awoken" from a low power "sleep" state and that a passcode is required for a user to unlock the lock screen. Some compliance rules can be based on time, geographical location, or network properties. For instance, a compliance rule can be satisfied when a client device 106 is located within a particular geographic location.

A compliance rule in another example can be satisfied when the client device 106 is in communication with a particular network 109, such as a particular local area network that is managed by the enterprise computing environment 103. Furthermore, a compliance rule in another example can be satisfied upon the time and date matching specified values.

Another example of a compliance rule involves whether a user belongs to a particular group of authorized users. A compliance rule can include a whitelist or a blacklist that specifies whether particular users or groups of users are authorized users. In various examples, the enterprise computing environment 103, the client device 106, or a combination of both the enterprise computing environment 103 and the client device 106 can determine whether a client device 106 satisfies a compliance rule.

In some examples, an enterprise can operate the management service 113 to ensure that the client devices 106 of its users satisfy various compliance rules. By ensuring that the client devices 106 of its users are operating in compliance with the compliance rules, the enterprise can control access to resources to thereby improve the security of devices associated with the enterprise and the users of the client devices 106.

The client device 106 is representative of multiple client devices 106 that can be coupled to the network 109. The client device 106 can include a processor-based computer system, such as a desktop computer, a laptop computer, a personal digital assistant, a mobile phone, or a tablet computer. The client device 106 can include output devices, such as a display and audio speakers, as well as one or more input devices, such as a mouse, keyboard, touch pad, or touch screen, which can facilitate a user interacting with and controlling the client device 106. In addition, the client device 106 can include a client data store 115, which can store data associated with the client device 106.

The client device 106 can include a first application 116a and a second application 116b. The applications 116 can include computer programs that perform various functionality. As one example, the first application 116a can be an agent application that can monitor activity on the client device 106 and determine whether settings for the client device 106 satisfy various compliance rules. The agent application can also communicate with the management service 113. The second application 116b can be a file viewer application. For example, the file viewer application can open and edit word processor files, multimedia files, and images. The file viewer application can also encrypt and decrypt files.

The applications 116 can be developed and distributed by the enterprise that operates the enterprise computing environment 103. In addition, the applications 116 can be secured applications. In this regard, enterprise security libraries can be included in the applications 116, and the management service 113 can monitor and control the applications 116.

The first application 116a can include a first session manager 119a, and the second application 116b can include a second session manager 119b. The session managers 119 can begin and terminate access sessions for the client device 106. An access session can be a time period for which a session manager 119 has authenticated a user of the client device 106. During an access session, the applications 116 can enable various functionality and provide access to various data or services. When a session manager 119 terminates an access session, the applications 116 can disable the functionality and prohibit access to data or services.

The client device 106 can also include a client data store 123. The client data store 123 can include data associated with the applications 116. For example, the client data store 123 can include secured content storage 126 and secured password storage 129. Data associated with the application 116 can be stored in the secured content storage 126. For example, files, such as word processing documents, images, and multimedia associated with the applications 116, can be stored in the secured content storage 126. The client device 106 can restrict access to the secured content storage 126 such that only particular applications can access the secured content storage 126. In one example, the operating system of the client device 106 can permit only a single application 116 to access the secured content storage 126, which the operating system can enforce based on a bundle identifier associated with the application 116 requesting access. In another example, the operating system of the client device 106 can permit only applications 116 associated with the enterprise that operates the enterprise computing environment 103 to access the secured content storage 126. In addition, the applications 116 can encrypt and decrypt the data in the secured content storage 126.

The secured password storage 129 can include keys that applications 116 can use to access data and services. For example, a key can be an encryption key used for decrypting encrypted data. As will be described in further detail below, the session managers 119 can also store timeout data in the secured password storage 129. The secured password storage 129 can also store various data shared between multiple applications 116. For example, authentication codes, such as keyed-hash message authentication codes (HMACs), and identifiers, such as unique device identifiers (UDIDs) can be stored in the secured password storage 129 for sharing between multiple applications 116. In some examples, the data in the secured password storage 129 can be accessible to only the applications 116 and other components that are signed with a particular developer certificate associated with the enterprise that provides the enterprise computing environment 103. If a component has not been signed with the enterprise's developer certificate, the operating system can prohibit the component from accessing the secured password storage 129. In some examples, the secured password storage 129 can be secured keychain storage.

Although FIG. 1 shows the session managers 119 being components of the respective applications 116, in alternative examples, a session manager 119 can be a component of the operating system. In addition, a session manager 119 in other examples can be installed in the enterprise computing environment 103 and communicate with the client device 106 through the network 109 to perform the functionality described herein.

Next, examples of the operation of the networked environment 100 are described. To begin, the user of the client device 106 can use an application 116 to enroll with the management service 113. During the enrollment process, the session manager 119 can request the user to provide a user code. The user code can be a code chosen by the user of the client device 106. In some examples, the user code can be a six-digit personal identification number (PIN).

After the session manager 119 obtains the user code, the session manager 119 can derive a key based on the user code. For example, the session manager 119 can apply the user code as an input to an algorithm that generates keys. The generated key can be used to access data and services associated with the management service 113. For example, the key can be used as an encryption key for encrypting and decrypting data in the secured content storage 126.

The session manager 119 can also generate timeout data that can indicate when an access session will expire. The timeout data can indicate the expiration time in various formats. For example, the timeout data can specify the particular time when the access session will expire. Alternatively, the timeout data can specify the time when the timeout data was generated, and a session manager 119 can later calculate the expiration time based on the timeout data. The duration of the access session can be predefined, or an administrator of the enterprise computing environment 103 can specify the access session duration. In some examples, the timeout data can be specified by a compliance rule that determines the access session must timeout at a particular time for the client device 106 to be deemed compliant.

After a session manager 119 has generated the key and timeout data, the session manager 119 can store this information in the secured password storage 129. The operating system of the client device 106 can restrict access to the secured password storage 129. In particular, the operating system can permit access for only applications 116 and other components that have been signed with a developer certificate that is associated with enterprise that operates the enterprise computing environment 103. Accordingly, the session manager 119 can store and retrieve data, such as the key and timeout data, in the secured password storage 129, but other components that are not signed with the enterprise's developer certificate cannot access the secured password storage 129.

From time to time, a session manager 119 can determine whether an access session is active. In some examples, a session manager 119 can periodically determine whether an access session is active at predetermined time intervals. In other examples, a session manager 119 can make this determination in response to particular activity being performed using the client device 106. For example, a session manager 119 can determine whether an access session is active in response to a user activating an application 116. In other examples, a session manager 119 can determine whether an access session is active in response to an event that causes an application 116 to perform an action that requires user authentication. An example of an action that could require user authorization is an application 116 accessing the secured content storage 126.

To determine whether an access session is active, an application 116 can access the secured password storage 129, retrieve previously stored timeout data, and determine whether the timeout data indicates that the access session is expired. In one example, the timeout data can specify the expiration time of an access session, and a session manager 119 can determine whether the current time is later than the expiration time. If the current time is later than the expiration time, the session manager 119 can determine that the access session has expired. Otherwise, if the current time is earlier than the expiration time, the session manager 119 can determine that the access session is still active.

In alternative examples, the timeout data can specify the time when an access session began. A session manager 119 can determine whether the time difference between the current time and the time when the access session began exceeds a specified time duration. The particular time duration can be predefined or set by an administrator of the enterprise computing environment 103 in various examples.

If a session manager 119 determines that an access session has not expired, the session manager 119 can permit the application 116 to perform actions that require user authentication. For example, the session manager 119 can permit the application 116 to access and decrypt data stored in the secured content storage 126 using the key retrieved from the secured password storage 129.

However, if the session manager 119 determines that an access session has expired, the session manager 119 can prevent access to services or data that requires authentication. For example, the session manager 119 can instruct an application 116 to use the key from the secured password storage 129 to encrypt the data associated with the secured content storage 126. In addition, the session manager 119 can erase the key and timeout data stored in the secured password storage 129. By erasing the stored key, the session manager 119 can prevent components, including the applications 116, from accessing data or services that require the key. Thus, once a session manager 119 has determined that an access session has expired, the session manager 119 can prevent components in the client device 106 from accessing data and services that require authentication.

In addition, once the session manager 119 has determined that an access session has expired, the session manager 119 can re-authenticate the user and initiate a new access session. To this end, the session manager 119 can prompt the user to input the user code that the user provided during the enrollment process described above. After receiving the user code input by the user, the session manager 119 can determine whether the input user code matches the original user code that the user provided during the enrollment process. In some examples, the session manager 119 can determine whether the input user code matches the original user code by applying the input user code to the same algorithm that previously generated the key when the user enrolled with the management service 113. The session manager 119 can then attempt to decrypt data in the secured content storage 126 using the generated key. If the session manager 119 can successfully decrypt the data using the key, the session manager 119 can conclude that the user provided the correct user code. If the session manager 119 cannot successfully decrypt the data using the key, the session manager 119 can conclude that the user provided an incorrect user code. If the session manager 119 determines that the user provided the correct user code, the session manager 119 can initiate a new access session and store the key along with updated timeout data in the secured password storage 129.

The session managers 119 can also terminate access sessions in response to various events. For example, components in the client device 106 and the management service 113 can monitor activity and settings in the client device 106 and detect whether the client device 106 complies with compliance rules. If a component determines that the client device 106 fails to satisfy a compliance rule, the component can request a session manager 119 to terminate an access session, if an access session is active. Upon receiving the request, the session manager 119 can prevent access to services or data that requires authentication. For example, the session manager 119 can instruct an application 116 to use the key from the secured password storage 129 to encrypt the data associated with the secured content storage 126. In addition, the session manager 119 can erase the key and timeout data stored in the secured password storage 129. By erasing the stored key, the session manager 119 can prevent components, including the applications 116, from accessing data or services that require the key.

In some examples, a user could potentially defeat security mechanisms provided by the operating system, the session managers 119, and the management service 113 through unauthorized privilege escalation, a process also referred to as "jailbreaking" or "rooting." If a user performs an unauthorized privilege escalation, unauthorized components could potentially access the key stored in the secured password storage 129. To counteract this threat, some examples can encrypt the key stored in the secured password storage 129 based on the time the client device 106 last booted. In this regard, the key and the boot time can be applied as inputs to an encryption algorithm. Because unauthorized privilege escalation often requires the client device 106 to be rebooted during the unauthorized privilege escalation process, the boot time after an unauthorized privilege escalation will be different from the boot time when a session manager 119 generated a key. Thus, an unauthorized component may not be able to successfully decrypt an encrypted key because the boot time differs. In some examples, the boot time can be determined by making an API call to the operating system to retrieve the boot time.

Figure 2:
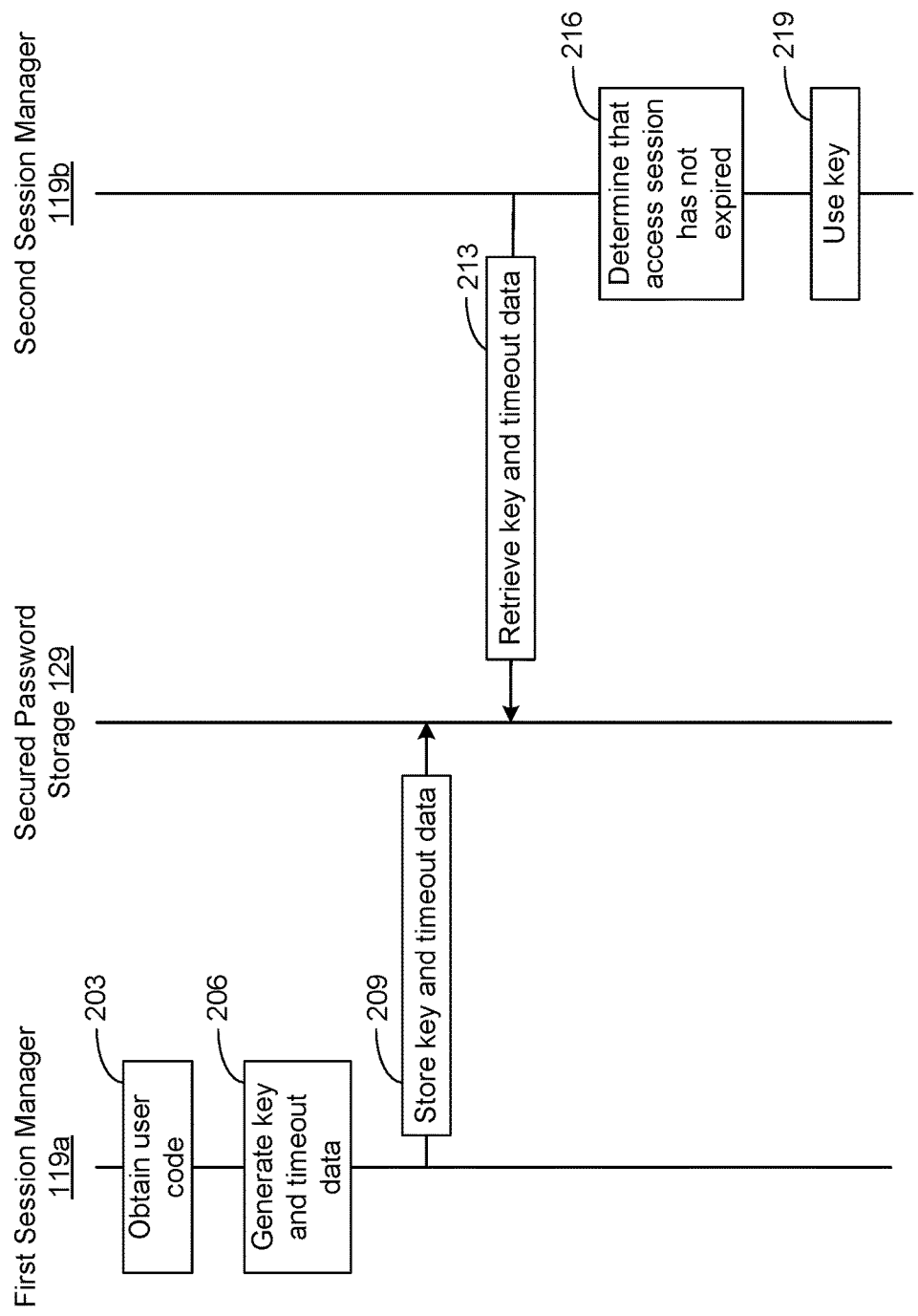
FIGS. 2-3 are sequence diagrams illustrating examples of component interaction.

Referring next to FIG. 2, shown is a sequence diagram illustrating an example of interactions between the first session manager 119a, the second session manager 119b, and the secured password storage 129. In particular, FIG. 2 illustrates an example of the first session manager 119 generating and storing a key in the secured password storage 129 and then the second session manager 119b using the stored key before the access session expires.

Beginning at step 203, the first session manager 119a can obtain a user code from the user of the client device 106. In some examples, the user code can be a six-digit PIN chosen by the user of the client device 106. The user can input the user code using a user interface rendered by the client device 106. The first session manager 119a can also determine whether the user has provided the correct user code, as described above.

At step 206, the first session manager 119a can generate a key derived from the user code. To this end, the first session manager 119a can apply the user code as an input to a key generator. As shown at step 209, the first session manager 119a can then store the key and timeout data. As described above, the timeout data can indicate the time that the access session expires. Additionally, in some examples, the first session manager 119a can encrypt the key using the latest boot time of the client device 106 so that the key can be inaccessible to components if the client device 106 is subject to an unauthorized privilege escalation, as described above.

After the first session manager 119a has stored the key and timeout data in the secured password storage 129, the second session manager 119b can retrieve the stored key and timeout data, as shown at step 213. In the example shown in FIG. 2, the current time is earlier than the access session expiration time as indicated by the timeout data. Accordingly, the second session manager 119b can determine that the access session initiated by the first session manager 119a has not expired, as shown at step 216.

As indicated at step 219, the second session manager 119b can then use the key retrieved from the secured password storage 129. For example, the second session manager 119b can use the key to access a service or to decrypt data in the secured content storage 126. For examples in which the first session manager 119a encrypted the key based on the boot time of the client device 106, the second session manager 119b can decrypt the key based on the boot time, prior to using the key. Thereafter, the process ends.

Figure 3:
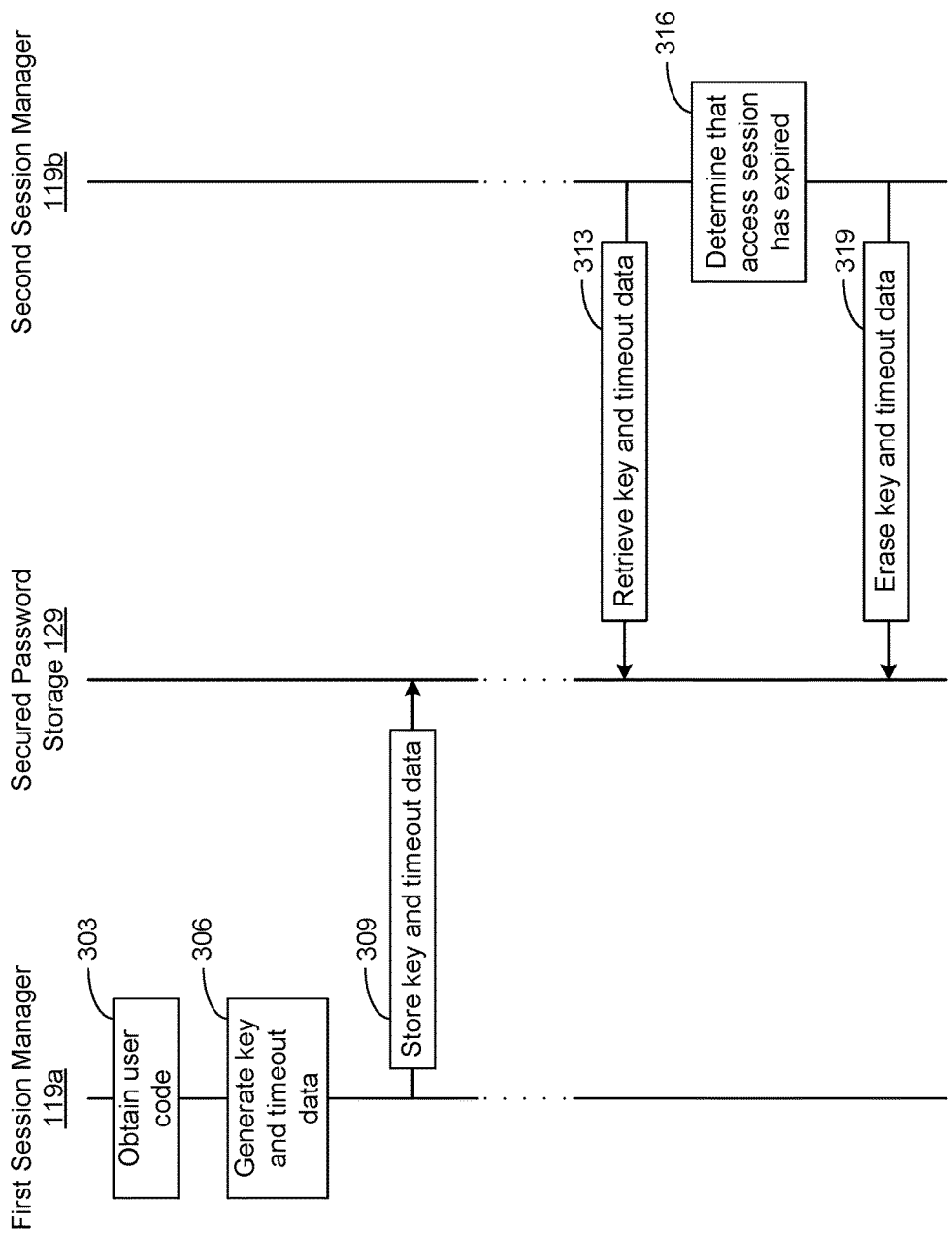

With reference to FIG. 3, shown is a sequence diagram illustrating an example of interactions between the first session manager 119a, the second session manager 119b, and the secured password storage 129. In particular, FIG. 3 illustrates an example of the first session manager 119 generating and storing a key in the secured password storage 129 and then the second session manager 119b erasing the stored key and timeout data because the access session has expired.

Beginning at step 303, the first session manager 119a can obtain a user code from the user of the client device 106. In some examples, the user code can be a six-digit PIN chosen by the user of the client device 106. The first session manager 119a can also determine whether the user has provided the correct user code, as described above.

At step 306, the first session manager 119a can generate a key derived from the user code. To this end, the first session manager 119a can apply the user code as an input to a key generator. As shown at step 309, the first session manager 119a can then store the key and timeout data. As described above, the timeout data can indicate the time that the access session expires. Additionally, in some examples, the first session manager 119a can encrypt the key using the latest boot time of the client device 106 so that the key can be inaccessible to components if the client device 106 is subject to an unauthorized privilege escalation, as described above.

After the first session manager 119a has stored the key and timeout data in the secured password storage 129, the second session manager 119b can retrieve the stored key and timeout data, as shown at step 313. In the example shown in FIG. 3, the current time is after the access session expiration time as indicated by the timeout data. Accordingly, at step 316, the second session manager 119b can determine that the access session has expired.

Because the second session manager 119b has determined that the access session has expired, the second application 119b can then erase the key and timeout data that the first session manager 119a stored in the secured password storage 129, as shown at step 319. By erasing the key, the second session manager 119b can prevent components in the client device 106, including the first application 116a and the second application 116b, from accessing data and services that require the key. Thereafter, the process ends.

Figure 4:
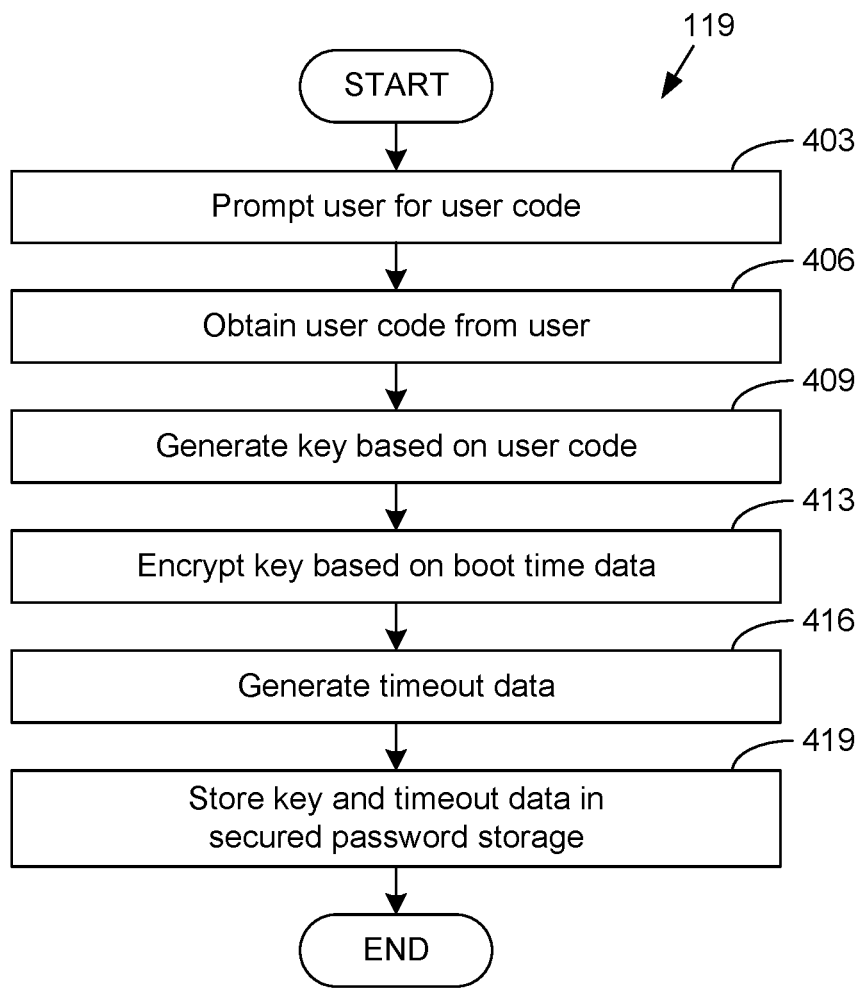
FIGS. 4 and 5A-5B are flowcharts illustrating examples of functionality implemented by a session manager in a client device.

With reference to FIG. 4, shown is a flowchart that provides an example of a portion of the operation of a session manager 119. In particular, FIG. 4 provides an example of the session manager 119 storing a key in the secured password storage 129 during an enrollment process with the management service 113. The flowchart of FIG. 4 can be viewed as depicting an example of a method implemented in the client device 106.

Beginning with step 403, the session manager 119 can prompt the user of the client device 106 to enter a user code.

To prompt the user, the session manager 119 can encode and render a user interface with a message requesting to enter the user code. The user code in some examples can be a six-digit pin. At step 406, the session manager 119 can obtain the user code from the user. The user can provide the user code through a user interface.

As shown at step 409, the session manager 119 can then generate a key based on the provided user code. For example, the user code can be applied as an input to a key generating algorithm. As described above, the key can be used to access data and services associated with the management service 113.

The session manager 119 can then move to step 413 and encrypt the key based on the latest time when the client device 106 booted. To this end, the key and the boot time can be applied as inputs to an encryption algorithm. As described above, encrypting the key based on the boot time can prevent a component accessing the stored key when the client device 106 has been subjected to an unauthorized privilege escalation.

The session manager 119 can then generate timeout data, as indicated at step 416. The timeout data can indicate the time when an access session expires. In some examples, the timeout data can specify the time when the timeout data was created, and a session manager 119 can calculate whether an access session has expired. In other examples, the timeout data can specify the time when an access session expires.

As shown at step 419, the session manager 119 can then store the key and the timeout data in the secured password storage 129. The data in the secured password storage 129 can be accessible to only the applications 116 and other components that are signed with a particular developer certificate associated with the enterprise that provides the enterprise computing environment 103. If a component has not been signed with the enterprise's developer certificate, the operating system can prohibit the component from accessing the secured password storage 129. Thereafter, the process ends.

Figure 5A:
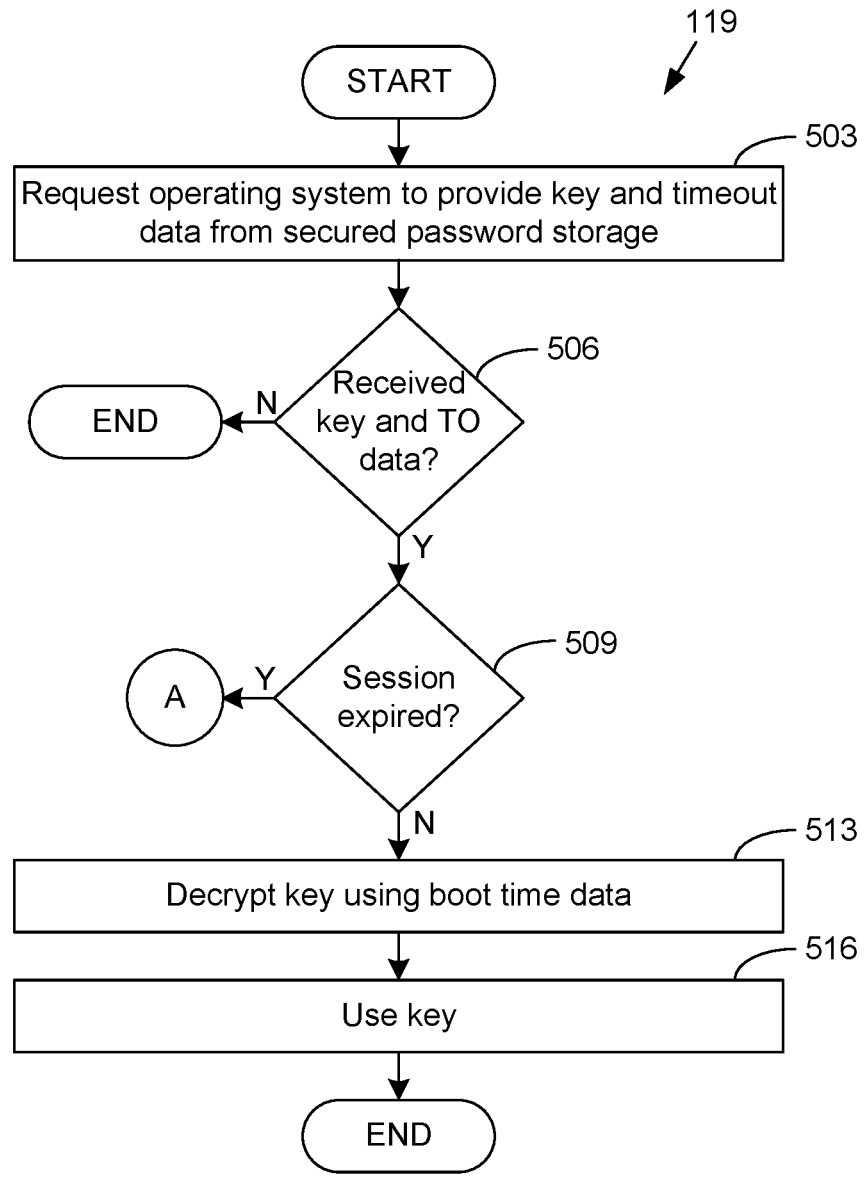
Figure 5B:
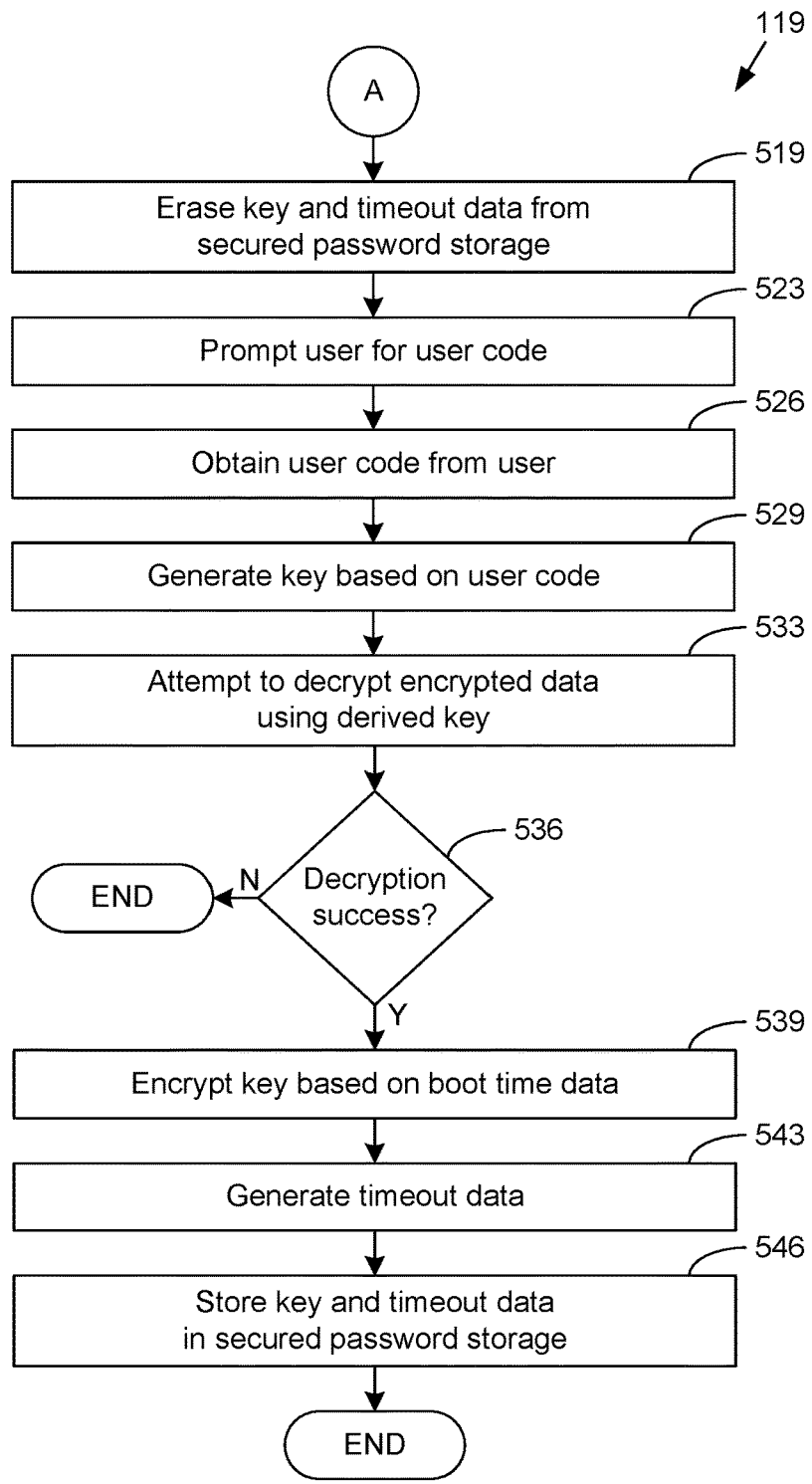

With reference to FIGS. 5A-5B, shown is a flowchart that provides another example of a portion of the operation of a session manager 119. In particular, FIGS. 5A-5B provides an example of the session manager 119 retrieving a stored key and determining whether an access session has expired. The flowchart of FIGS. 5A-5B can be viewed as depicting an example of a method implemented in the client device 106.

Beginning with step 503, the session manager 119 can request the operating system to provide the key and timeout data stored in the secured password storage 129. To make the request, the session manager 119 can provide an API call to the operating system.

At step 506, the session manager 119 can determine whether the session manager 119 received the requested key and timeout data. If the session manager 119 did not receive the requested key and timeout data, the process ends. In addition, the session manager 119 can notify the management service 113 or a user of the client device 106 that the session manager 119 was unable to access the secured password storage 129.

If the session manager 119 received the requested key and timeout data, the session manager 119 can move to step 509 and determine whether the access session has expired. In one example, the timeout data can specify the expiration time of an access session, and the session manager 119 can determine whether the current time is later than the expiration time. If the current time is later than the expiration time, the session manager 119 can determine that the access session has expired. Otherwise, if the current time is earlier than the expiration time, the session manager 119 can determine that the access session is still active.

If the session manager 119 determines that the access session has not expired, the session manager 119 can move to step 513 and decrypt the key using boot time data that represents the latest time that the client device 106 booted. The session manager 119 can obtain the boot time data by providing an API request to the operating system of the client device 106.

After the session manager 119 has decrypted the retrieved key using the boot time data, the session manager 119 can use the key, as indicated at step 516. For example, the session manager 119 can provide the key to an application 116 so that the application 116 can decrypt data in the secured content storage 126. After step 516, the process ends.

At step 509, if the session manager 119 determines that the access session has expired, the session manager 119 can move to step 519, which is shown in FIG. 5B. At step 519, the session manager 119 can erase the key and timeout data previously stored in the secured password storage 129. To this end, the session manager 119 can provide an API call to the operating system requesting to delete the key and the timeout data.

The session manager 119 can then re-authenticate the user. As shown at step 523, the session manager 119 can prompt the user to enter the user code. To this end, the session manager 119 can encode and render a user interface with a message requesting the user to enter the user code. At step 526, the session manager 119 can then obtain the user code provided by the user. As described above, the user code in some examples is a six-digit PIN.

As shown at step 529, the session manager 119 can then generate a key based on the received user code. For example, the session manager 119 can apply the user code to the same key generation algorithm that was used to generate the previously stored key. At step 533, the session manager 119 can then use the key to attempt to decrypt data in the secured content storage 126.

At step 536, the session manager 119 can determine whether the decryption using the key was successful. In this regard, the session manager 119 can determine whether the output of the decryption process resulted in data that is not corrupt. By determining whether the key, which is derived from the provided user code, can successfully decrypt data from the secured content storage 126, the session manager 119 can determine whether the user provided the correct user code.

If the decryption was not a success, the process ends. In other examples, the session manager 119 can return to step 523 and attempt to re-authenticate the user. In some examples, after a particular number of re-authentication attempts, the session manager 119 can stop attempting to re-authenticate the user and can also notify the management service 113 of that a potential unauthorized user has attempted to access the client device 106.

If the decryption was a success, the session manager 119 can move to step 539 and encrypt the key based on boot time data that represents the latest time that the client device 106 booted. The session manager 119 can obtain the boot time data by providing an API request to the operating system of the client device 106.

As shown at step 543, the session manager 119 can then generate updated timeout data indicating that time when the newly created access session expires. At step 546, the session manager 119 can store the newly generated key and timeout data in the secured password storage 129. To this end, the session manager 119 can provide an API call to the operating system requesting the operating system to store this data. Thereafter the process ends.

The sequence diagrams and flowcharts of FIGS. 2-4 and 5A-5B show examples of the functionality and operation of implementations of components described herein. The components of the networked environment 100 described herein can be embodied in hardware, software, or a combination of hardware and software. If embodied in software, each step in the sequence diagrams and flowcharts of FIGS. 2-4 and 5A-5B can represent a module or a portion of code that includes computer instructions to implement the specified logical functions. The computer instructions can include source code that comprises human-readable statements written in a programming language or machine code that comprises machine instructions recognizable by a suitable execution system, such as a processor in a computer system. If embodied in hardware, each step can represent a circuit or a number of interconnected circuits that implement the specified logical functions.

Although the sequence diagrams and flowcharts show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The enterprise computing environment 103 and client device 106 described herein can include at least one processing circuit. Such a processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, portions of the management service 113 and the applications 116 can be stored in one or more storage devices and be executable by one or more processors. Also, the client data store 123 can be located in the one or more storage devices.

The management service 113 and the applications 116 can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software or computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A computer-implemented method for providing an access session for at least one application, the computer-implemented method comprising:
generating a key for the access session based on a code obtained through a user interface, wherein the key decrypts data stored in a data store of a client device;
encrypting the key based on a boot time that represents a latest time the client device was booted, wherein the boot time and the key are applied as inputs to an encryption algorithm;
storing the key in secured storage of the client device, wherein the secured storage is accessible by the at least one application based on a developer certificate; and
accessing the data based on the key.

2. The computer-implemented method of claim 1, further comprising:
retrieving the key from the secured storage;
providing a request for boot time data to an operating system of the client device, wherein the operating system provides the boot time; and
decrypting the key based on the boot time.

3. The computer-implemented method of claim 2, further comprising decrypting the data based on the key.

4. The computer-implemented method of claim 1, further comprising:
providing a request for boot time data to an operating system of the client device, wherein the operating system provides an updated boot time;
determining that the updated boot time fails to decrypt the key, wherein the boot time is different from the updated boot time; and
generating an authentication prompt in the user interface.

5. The computer-implemented method of claim 1, wherein the key comprises an encryption key configured to decrypt data stored in secured content storage associated with a management service that monitors activity for a plurality of client devices.

6. The computer-implemented method of claim 1, wherein the secured storage is a secured password storage, and the data store is a secured content storage accessible by the at least one application based on the developer certificate.

7. The computer-implemented method of claim 1, further comprising storing timeout data in association with the key in the secured storage.

8. A non-transitory computer-readable medium embodying instructions for providing an access session for at least one application, wherein when executed the instructions cause at least one computing device to:
generate a key based on a code obtained through a user interface, wherein the key decrypts data stored in a data store of a client device;
encrypt the key based on a boot time that represents a latest time the client device was booted, wherein the boot time and the key are applied as inputs to an encryption algorithm; and
store the key in secured storage of the client device, wherein the secured storage is accessible by the at least one application based on a developer certificate; and
access the data based on the key.

9. The non-transitory computer-readable medium of claim 8, wherein when executed the instructions further cause the at least one computing device to:
retrieve the key from the secured storage;
provide a request for boot time data to an operating system of the client device, wherein the operating system provides the boot time; and
decrypt the key based on the boot time.

10. The non-transitory computer-readable medium of claim 9, wherein when executed the instructions further cause the at least one computing device to decrypt the data based on the key.

11. The non-transitory computer-readable medium of claim 8, wherein when executed the instructions further cause the at least one computing device to:
provide a request for boot time data to an operating system of the client device, wherein the operating system provides an updated boot time, wherein the updated boot time is different from the boot time;
determine that the updated boot time fails to decrypt the key; and
generate an authentication prompt in the user interface.

12. The non-transitory computer-readable medium of claim 8, wherein the key comprises an encryption key configured to decrypt data stored in secured content storage associated with a management service that monitors activity for a plurality of client devices.

13. The non-transitory computer-readable medium of claim 8, wherein the secured storage is a secured password storage, and wherein the data store is a secured content storage accessible by the at least one application based on the developer certificate.

14. A system for providing an access session for at least one application, the system comprising:
at least one computing device;
instructions executable by the at least one computing device, wherein when executed the instructions cause the at least one computing device to:
generate a key based on a code obtained through a user interface, wherein the key decrypts data stored in a data store of a client device;
encrypt the key based on a boot time that represents a latest time the client device was booted, wherein the boot time and the key are applied as inputs to an encryption algorithm;
store the key in secured storage of the client device, wherein the secured storage is accessible by the at least one application based on a developer certificate; and
access the data based on the key.

15. The system of claim 14, wherein when executed the instructions further cause the at least one computing device to:
retrieve the key from the secured storage;
provide a request for boot time data to an operating system of the client device, wherein the operating system provides the boot time; and
decrypt the key based on the boot time.

16. The system of claim 15, wherein when executed the instructions further cause the at least one computing device to decrypt the data based on the key.

17. The system of claim 14, wherein when executed the instructions further cause the at least one computing device to:
provide a request for boot time data to an operating system of the client device, wherein the operating system provides an updated boot time, wherein the updated boot time is different from the boot time;
determine that the updated boot time fails to decrypt the key; and
generate an authentication prompt in the user interface.

18. The system of claim 14, wherein the key comprises an encryption key configured to decrypt data stored in secured content storage associated with a management service that monitors activity for a plurality of client devices.

19. The system of claim 14, wherein the secured storage is a secured password storage, and wherein the data store is a secured content storage accessible by the at least one application based on the developer certificate.

20. The system of claim 14, further comprising storing timeout data in association with the key in the secured storage.

* * * * *